June 18, 1940.  L. A. WELLS  2,204,739
GLARE SHIELD
Filed March 10, 1939   2 Sheets-Sheet 1
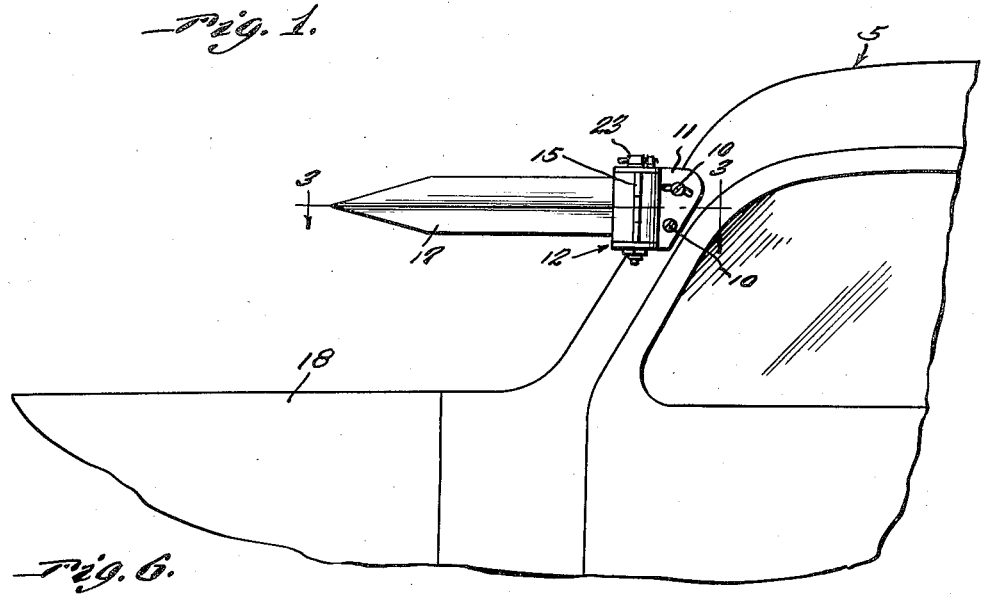
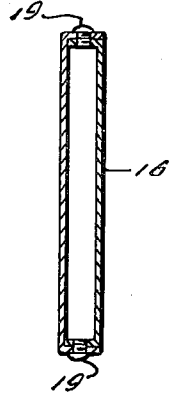
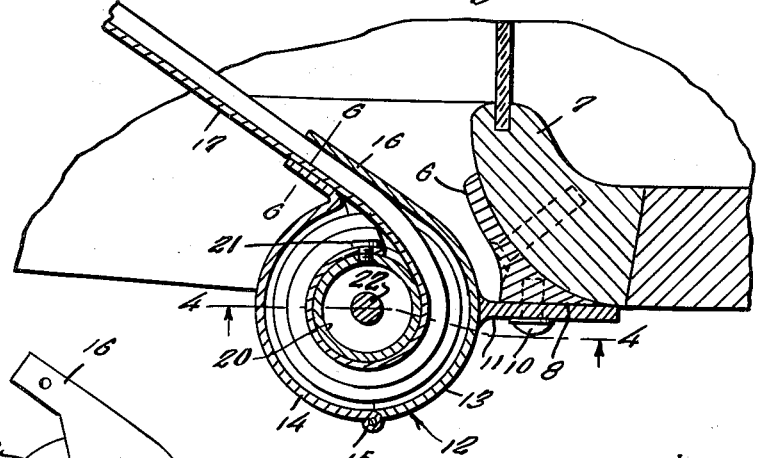
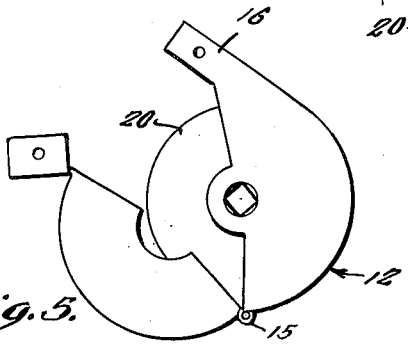
Inventor
L. A. Wells
By Clarence A. O'Brien
and Hyman Berman
*Attorneys*

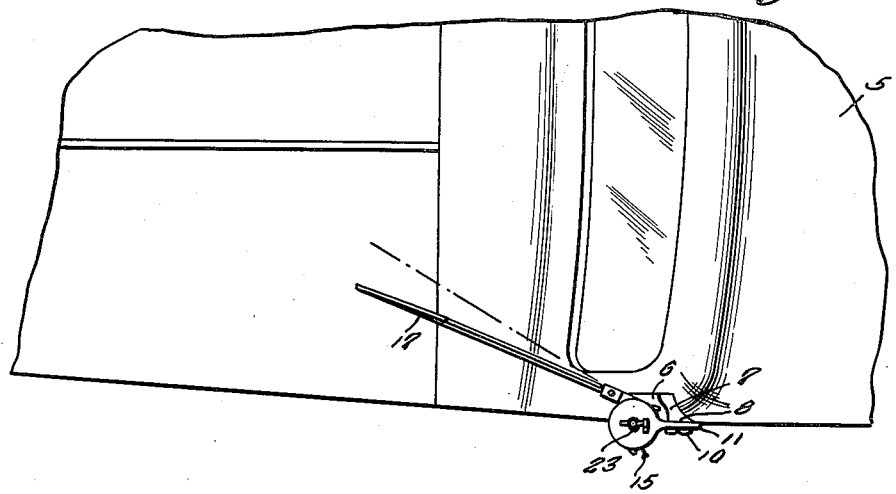
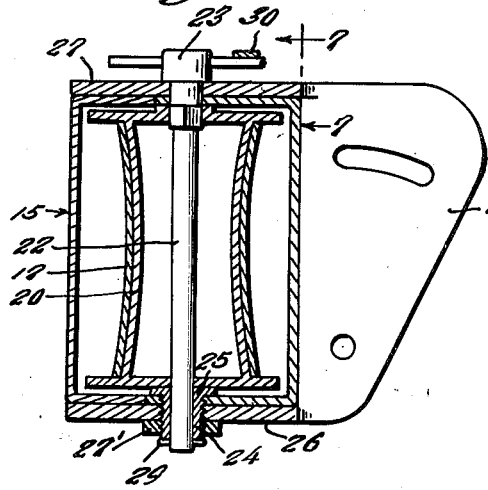
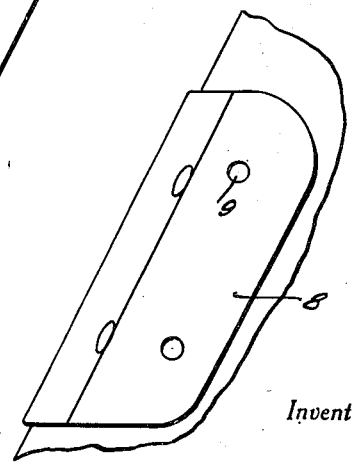
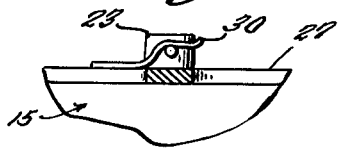

Patented June 18, 1940

2,204,739

UNITED STATES PATENT OFFICE 2,204,739

GLARE SHIELD

Latinus A. Wells, Danville, Va., assignor of one-eighth to H. Gordon Tuggle and one-eighth to Jack L. Neal, both of Danville, Va.

Application March 10, 1939, Serial No. 261,050

2 Claims. (Cl. 296—97)

This invention relates to a glare shield especially adapted for protecting the driver of a motor vehicle from glare of headlights of approaching motor vehicles, and has for the primary object the provision of a device of this character which may be easily and quickly installed on a motor vehicle and may be easily brought into a position in advance of the windshield and at a selected angle thereto so that the driver may readily bring the line of vision with the oncoming motor vehicle headlights so that the glare will be intercepted by the shield and still permit the driver to see the road and the oncoming motor vehicle by looking over or under said shield.

Another object of this invention is the provision of a device of the above stated character which includes a combined mounting and housing for the shield so that the latter may have its elevation and angle with respect to the windshield varied and will provide a concealment for the shield when not in use, such as driving in the daytime and may be readily brought into operation for night driving.

With these and other objects in view, the invention consists in certain novel features of construction, combination and arrangement of parts to be hereinafter more fully described and claimed.

For a complete understanding of my invention, reference is to be had to the following description and accompanying drawings, in which:

Figure 1 is a fragmentary side elevation illustrating a portion of a motor vehicle body equipped with a glare shield constructed in accordance with my invention.

Figure 2 is a fragmentary top plan view showing a portion of the motor vehicle body with the shield applied thereto and in an operative position.

Figure 3 is a sectional view taken on the line 3—3 of Figure 1.

Figure 4 is a sectional view taken on the line 4—4 of Figure 3.

Figure 5 is a top plan view illustrating the housing in an open position.

Figure 6 is a sectional view taken on the line 6—6 of Figure 3.

Figure 7 is a detail sectional view taken on the line 7—7 of Figure 4.

Figure 8 is a fragmentary side elevation illustrating an attaching bracket and showing the same applied to a portion of a windshield post of the motor vehicle body.

Referring in detail to the drawings, the present invention is adapted on a motor vehicle body 5 through the use of a bracket or attaching plate 6 bolted or otherwise secured on the left hand windshield post 7 of the body and includes a flat face 8 provided with screw threaded sockets 9 to receive set screws 10. The set screws 10 extend through an opening and a slot of an attaching plate 11 forming a support for a housing 12. Through the use of the set bolts and aperture and slot of the attaching plate, the housing may be readily adjusted with respect to a perpendicular line. The attaching plate 11 is formed on the housing 12 and the latter includes sections 13 and 14 connected by a hinge 15. The housing is of cylindrical shape and includes sectional top and bottom walls wherein the sections of said walls are integral with the sections 13 and 14 of the housing. The section 13 of the housing has formed thereon a throat 16 acting as a guide for a shield element 17 constructed of opaque material capable of flexing, however, containing sufficient rigidity that it will maintain a position extending from the housing for the purpose of shielding the driver's eyes from glare of approaching headlights. It may be preferable that the shield element 17 be constructed of a good grade of steel and is of a width sufficient to provide the necessary shielding effect to the driver's eyes and still permit the driver to look over or under said shield for the purpose of viewing the roadway in advance of the motor vehicle.

The throat 16 extends at an angle from the casing for the purpose of directing the shield element 17 at an angle to the windshield and in a direction diagonally across the hood 18 of the motor vehicle body. It has been found that if the shield element is positioned at angle of approximately 45° to the windshield it will be most serviceable in shielding the eyes of the driver of the vehicle.

A portion of the throat 16 is carried by the section 14 of the housing and when said housing is in a closed position the portion of the throat carried by the section 14 overlaps the part carried by the section 13 of the housing and may be provided with detents 19 for securing the housing in a closed position.

A drum 20 is mounted in the housing for rotation therein and has one end of the shield element 17 secured thereto, as shown at 21. A portion of the shield element is wound on the drum and passes therefrom through the throat 16. By rotating the drum in one direction the shield element may be wound on said drum to draw said shield element substantially within the housing. The shield element when thus positioned is substantially concealed from view and occupies such position in the day time so as not to in any way interfere with the vision of the driver. However, at night time the drum is rotated in a reverse direction and the shield element is extended to shield the eyes of the driver from glare of approaching headlights of other vehicles in a position as heretofore described.

The top and bottom walls of the housing carried by the section 13 of said housing are provided with aligned openings to receive a shaft 22 and is provided with a squared portion to fit in a squared opening provided in one end of the drum. The upper end of the shaft is provided with a finger piece 23 so that the operator may readily rotate the shaft and consequently rotate the drum in a direction desired for the adjustment of the shield element inwardly and outwardly of the housing.

A bushing 24 is threaded in the opening of the bottom wall of the housing and is equipped with a flange 25 overlying the bottom wall of said housing and is also threaded in an opening provided in a portion 26 of the attaching plate 11. The attaching plate 11 has a similar portion 27 which overlies the top wall of the housing and is apertured to permit the shaft 22 to extend therethrough. The bushing 24 has a nut 27' threaded thereon which binds against the portion 26 of the attaching plate. The purpose of the bushing and the nut 27' is to secure the housing between the portions 26 and 27 against rotation. However, by loosening the nut 27' the housing can be rotated about a vertical axis for the purpose of varying the angle of the shield element with respect to the windshield. The lower end of the shaft 22 extends through the bushing and is apertured to receive a cotter key 29 which can be removed when it is desired to remove the shaft 22 for the purpose of removing the housing from the attaching plate 11.

A catch 30 of a leaf spring type is secured on the portion 27 of the attaching plate in the path of the finger piece 23. The catch 30 will permit the finger piece to ride freely thereover when the finger piece is rotated in one direction. However, when the finger piece is rotated in a reverse direction it engages with the catch and prevents rotation of said shaft. When the finger piece comes in engagement with the catch, as shown in Figure 7, the shield element 17 has been substantially drawn into the housing.

A glare shield of the character described and shown in the drawings is extremely easy to install on a motor vehicle and when not in use will be practically unobstructable to the vision of the driver and when extended for driving at night time will provide an efficient shield for the protection of the driver's eyes against glare from approaching headlights of other motor vehicles. Further, it will be seen that the angle of the shield element with respect to the windshield can be readily varied through the adjustment of the housing within the supporting members 26 and 27 of the attaching plate 11. Further, the elevation of the shield element may be easily varied through the adjustment of the attaching plate 11 on the plate 8 secured to the windshield post of the body of the motor vehicle. Further, it will be seen that a device of this character will be extremely simple in construction, compact and durable and may be manufactured and sold at a low cost.

It is believed that the foregoing description, when taken in connection with the drawings will fully set forth the construction and advantages of this invention to those skilled in the art to which such a device relates, so that further detailed description will not be required.

What I claim is:

1. A glare shield comprising an elongated shield element, a housing having a throat to receive said shield element, a drum journaled in said housing and including a shaft for the rotation thereof and having one end of the shield element secured thereon and a portion of said shield element wound thereon, an attaching bracket including spaced portions to rotatably receive said housing, means for releasably securing said housing to one of said portions, a second plate pivotally and slidably connected to the first-named plate and mounted on a windshield post of a motor vehicle body, a finger piece secured to said shaft, and a spring catch carried by one of said portions to be engaged by the finger piece for limiting the rotation of the shaft in one direction.

2. A glare shield comprising an elongated shield element, a housing having a throat to receive said shield element and including hingedly connected sections, means for adjustably mounting said housing on a windshield post of a motor vehicle body, a drum journaled in said housing and having the shield element secured thereto and partly wound thereon, and an operating means for the rotation of said drum.

LATINUS A. WELLS.